United States Patent [19]

Jeong

[11] Patent Number: 5,392,073
[45] Date of Patent: Feb. 21, 1995

[54] MOTION ESTIMATING DEVICE FOR VARIABLE LENGTH ENCODED DATA

[75] Inventor: Je-Chang Jeong, Seoul, Rep. of Korea

[73] Assignee: Samsung Electronics Co., Ltd., Kyungki-do, Rep. of Korea

[21] Appl. No.: 58,375

[22] Filed: May 10, 1993

[30] Foreign Application Priority Data

May 8, 1992 [KR] Rep. of Korea ............... 1992 7757

[51] Int. Cl.$^6$ .................. H04N 7/137; H04N 7/12; H04N 7/133
[52] U.S. Cl. .................... 348/413; 348/402; 348/416; 348/407
[58] Field of Search ............. 358/135, 136, 133, 105; 348/699, 402, 407, 413, 416, 384; H04N 7/137, 7/12, 11/02, 7/133

[56] References Cited

U.S. PATENT DOCUMENTS

| | | | |
|---|---|---|---|
| 4,957,688 | 9/1990 | De With | 358/135 |
| 5,006,929 | 4/1991 | Barbero et al. | 358/135 |
| 5,068,722 | 11/1991 | Sugiyama | 358/136 |
| 5,121,202 | 6/1992 | Tanoi | 348/416 |
| 5,136,376 | 8/1992 | Yagasaki et al. | 348/384 |
| 5,136,615 | 8/1992 | Tanoi | 348/415 |
| 5,150,432 | 9/1992 | Ueno et al. | 358/136 |
| 5,198,900 | 3/1993 | Tsukagoshi | 358/133 |
| 5,237,410 | 8/1993 | Inoue | 358/136 |
| 5,267,037 | 11/1993 | Sugiyama | 348/384 |

*Primary Examiner*—Jeffery Brier
*Assistant Examiner*—Vu Le
*Attorney, Agent, or Firm*—Sughrue, Mion, Zinn, Macpeak & Seas

[57] ABSTRACT

An apparatus for digitally encoding/decoding data including pictorial images and sounds for use in High Definition Television (HDTV), High Definition-Video Tape Recorder (HD-VCR), digital VCR, digital camcorder, multimedia, videophone, and video conference type applications. The apparatus includes a motion estimating device for a variable length encoder which encodes a video signal into variable length encoded data. The motion estimating device includes a mean error calculating circuit, responsive to the video signal, for calculating a mean error corresponding to an estimated difference between pixel data of a reference picture and pixel data of a current picture of the video signal, and a motion vector setting circuit, coupled to an output of the mean error calculating circuit, for generating a motion vector corresponding to a minimum horizontal/vertical displacement of the current picture relative to the reference picture.

4 Claims, 3 Drawing Sheets

MOTION ESTIMATING DEVICE FOR VARIABLE LENGTH ENCODED DATA

BACKGROUND OF THE INVENTION

The present invention is directed to an apparatus for digitally encoding/decoding data including pictorial images and sounds for use in, for example, High Definition Television (HDTV), High Definition-Video Tape Recorder (HD-VCR), digital VCR, digital camcorder, multimedia, videophone, and video conference type applications. More particularly, the present invention relates to a motion estimating device for variable length encoded data.

Korean Patent Application No. 92-7757, upon which a claim to priority is made, is incorporated herein by reference.

Recently, interest and attention has been directed to methods for digitally encoding images and sound data for storing and/or transmitting and methods for subsequently decoding the stored or transmitted encoded data.

In devices such as a HDTV, HD-VCR, digital VCR, digital camcorder, multimedia, videophone, video conference and the like, there is presently an ongoing international effort to develop a standardized coding method, which is adequate to suit the respective fields for each of the above devices.

Referring to FIG. 1, there is shown a block diagram of a conventional motion compensated Differential Pulse Code Modulation (DPCM) coded transmitting device, which implements one method of reducing the amount of data and restricting the amount of redundancy in a video signal. Other methods to achieve the same results include transform coding, DPCM, vector quantization, and variable length coding.

According to FIG. 1, an $N \times N$ transform unit 1 divides a picture into a gathering of small blocks of $N \times N$ ($N=8$, for example) in order to perform data compression within the picture, and transforms each respective block so as to convert a video signal VS from the time domain to the frequency domain. As a result of the transformation, the signal energy is gathered mainly toward the low frequency areas. The transform unit 1 may implement any of the following transformation functions, including a Discrete Cosine Transform (DCT), a Walsh-Hadamard Transform (WHT), a Discrete Fourier Transform (DFT), a discrete Sine Transform (DST), etc. The DCT is the most widely used.

A quantizer 3 quantizes transform coefficients, which are output by the $N \times N$ transform unit 1 in accordance with a quantization step size q determined by the state of a buffer 6. In other words, the transform coefficients are changed or quantized to representative values, which the human naked eye cannot distinguish from the values prior to the quantization process.

At this time, the quantization step size q, which continues to change in accordance with the state of the buffer, controls the quantization to thereby adjust the bit rate and to thereafter transmit the same to a receiving terminal.

A variable length encoder 5, which is coupled to an output of the quantizer 3, makes the most of statistical characteristics of the representative quantized values from the quantizer 3 and performs variable length coding to thereby compress the data, accordingly.

A buffer 6 receives the compressed data from the variable length encoder 5. The buffer 6 adjusts the rate at which data is received from the variable length encoder 5 to thereby output the same CVS. At the same time, the quantization step size q, which changes according to the degree of fullness of the buffer, is fedback to adjust the data output of the quantizer 3, so as to prevent data overflows and underflows.

Meanwhile, the data amount outputted from the quantizer 3 can be further compressed by a motion compensation method. In other words, the data amount can be compressed by utilization of the similarity between the pictures. In particular, because there is no change between pictures in the case of a still picture, for example, the data amount can further be compressed.

A motion vector can be obtained by estimating the amount of motion of a picture (which is not necessarily a still picture). The motion between successive pictures is compensated through the use of a motion vector. Since the difference between two pictures or the motion thereof is very small, data compression can be made possible.

A motion compensated DPCM method has been adopted between pictures in FIG. 1 utilizing such characteristics. Specifically, the motion compensation is performed by a DPCM loop comprised of a frame memory 7, a motion estimation unit 8, and a motion compensation unit 9.

An inverse quantizer 4 inversely quantizes the quantized data prior to performing the motion compensation process, and an $N \times N$ inverse transform unit 2 transforms a signal from the frequency domain to a video signal in the time domain.

A motion estimating unit 8 receives video data of a prior picture stored in the frame memory 7 and an inputted video signal to thereby estimate the amount of motion between the two pictures and to generate a motion vector MV. The motion is based on the difference of the inputted video signal relative to the prior picture. The motion vector MV is then transmitted to a decoding unit and outputted to the motion compensation unit 9.

The motion compensating unit 9 receives video data from a corresponding position of the frame memory 7 according to the motion vector MV obtained from the motion estimating unit 8 to thereby compensate for the motion. The compensated motion is added to an output of the $N \times N$ inverse transform unit 2 to thereafter be inputted to the frame memory 7.

The picture compensated from the motion compensating unit 9 is further inputted to a first mixer A1, which produces an error signal by subtracting the output of the motion compensating unit 9 from a current picture signal VS.

At this stage, a first and a second switch SW1 and SW2 cut off an output signal of the motion compensation unit 9 either by block or by frame in order to prevent errors from increasing on a picture where quantized noises generating from the DPCM loop are accumulated and restored, to thereby effect intraframe coding.

Meanwhile, in order to obtain the motion vector MV from the aforementioned motion estimating unit 8, a block matching method is employed.

In other words, first, the present picture is partitioned into a motion block of $N_1 \times N_2$, and a determination is made as to its position within the reference picture having a seek domain of $M_1 \times M_2$. The motion vector MV is then computed at the point in which the Mean Absolute Error MAC or Mean Square Error MSE is minimized.

FIG. 2 illustrates a block diagram of a conventional motion estimating unit for determining the motion vector MV.

In FIG. 2, a first $N_1 \times N_2$ block forming unit 10 partitions the incoming picture into a block of $N_1 \times N_2$ size (N being a pixel unit).

An $M_1 \times M_2$ block forming unit 20 establishes a seek domain on a reference picture (i.e., a picture prior to the current picture or a prior picture reproduced from the DPCM loop), which is stored in the frame memory 7.

In other words, in order to determine the position within the reference picture the $N_1 \times N_2$ block has moved, a seek block of $M_1 \times M_2$, which is larger than the block of $N_1 \times N_2$ that is about to be encoded is established.

A second $N_1 \times N_2$ block forming unit 30, which is coupled to an output of the block forming unit 20, generates data of a $N_1 \times N_2$ block size according to a horizontal/vertical displacement (K,1) value.

An adder A10 obtains a data error outputted from the first and second $N_1 \times N_2$ block forming units 10 and 30, and a mean error calculating unit 40 calculates an absolute mean (or a square mean) based on the errors outputted from the adder A10.

A minimum value seek unit 50 selectively outputs as the motion vector MV the horizontal/vertical displacement (K,l) value when it possesses the smallest error value out of the error values calculated from the mean error calculating unit 40.

In other words, the error value is calculated while the horizontal/vertical displacement (K,l) value is changed, and a block is recognized as a moved block when the calculated error value is the smallest so that the horizontal/vertical displacement (k,l) value is recognized as the motion vector MV, which is then outputted.

At this point, in order to obtain the mean error from the mean error calculating unit 40, methods such as the Mean Absolute Error or Mean Square Error among pixels of respective blocks and the like are typically utilized.

However, although the conventional technique for implementing the above-described motion vector estimation process is effective when a motion vector is transmitted as a code of a fixed length, it is difficult to implement the same process for a variable length encoded motion vector because it is difficult to determine when a coded final data amount is minimized.

In other words, there is a problem in that a whole vector amount tends to be increased if the code length of the motion vector is lengthened and when the motion vector is variable length encoded, even though the amount of data of the image signal is minimized.

SUMMARY OF THE INVENTION

Accordingly, it is an object of the present invention to overcome the above and other problems by providing a motion estimation device for variable length encoded data which can generate a motion vector based on a sum of a data amount taken after the motion vector is variable-length encoded and a variable length-encoded data amount of a minimized video signal.

In order to achieve the above and other objects, the present invention provides a motion estimating device for a variable length encoder which encodes a video signal into variable length encoded data including a mean error calculating circuit, responsive to the video signal, for calculating a mean error corresponding to an estimated difference between pixel data of a reference picture and pixel data of a current picture of the video signal, and a motion vector setting circuit, coupled to an output of the mean error calculating circuit, for generating a motion vector corresponding to a minimum horizontal/vertical displacement of the current picture relative to the reference picture.

BRIEF DESCRIPTION OF THE DRAWINGS

For a more complete understanding of the advantages and objects of the present invention, reference should be made to the following detailed description taken in conjunction with the accompanying drawings in which.

DETAILED DESCRIPTION OF A PREFERRED EMBODIMENT

The present invention will now be described in further detail with reference to the accompanying drawings.

Figure 3:
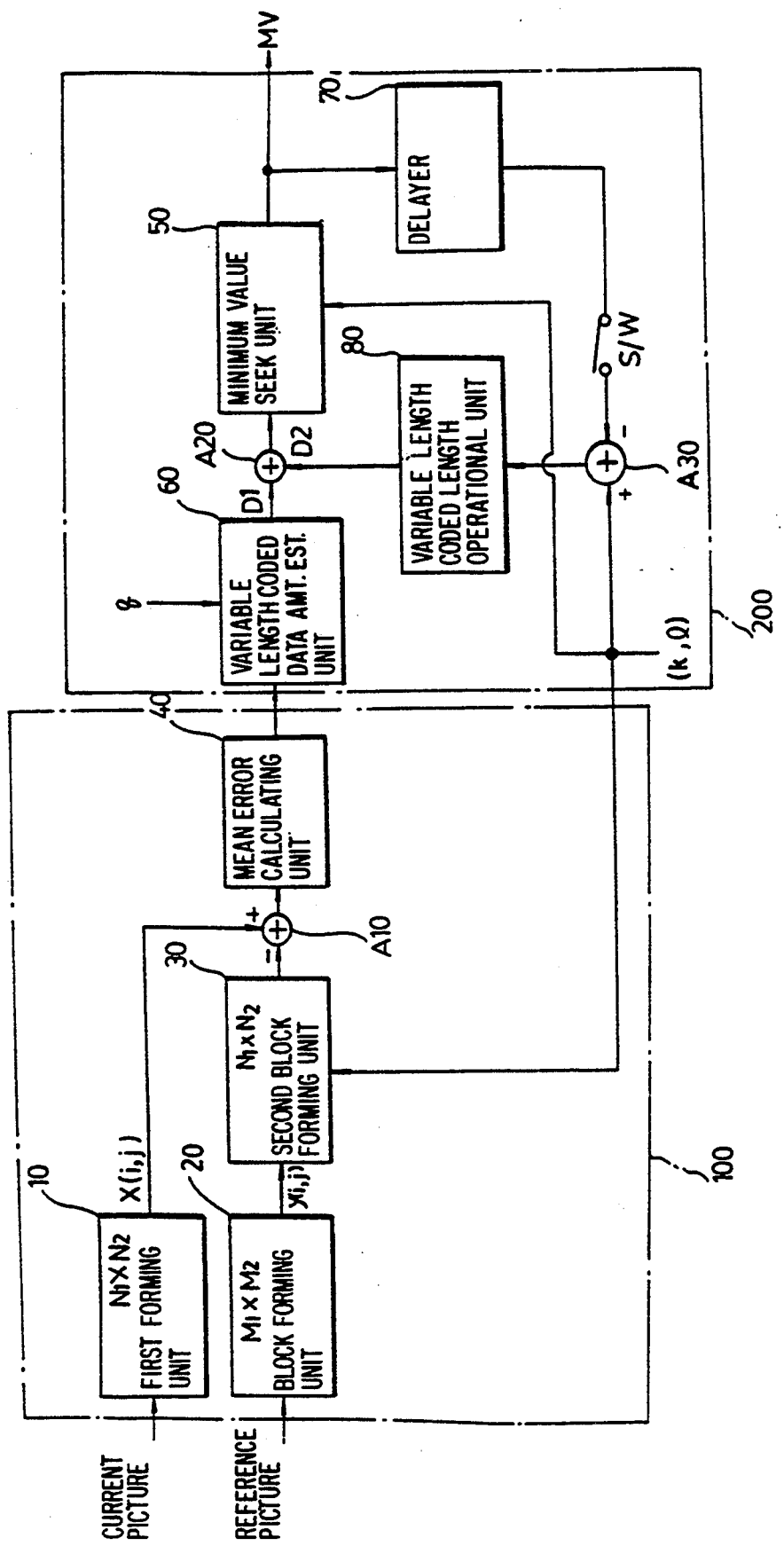
FIG. 3 is a block diagram of a motion estimating device in accordance with the present invention.

FIG. 3 illustrates a motion estimating device in accordance with the present invention. The device includes a mean error calculating circuit 100 and a motion vector setting circuit 200. The mean error calculating circuit 100 calculates a mean pixel data error by estimating the amount of motion between a reference picture and a current picture. The motion vector setting circuit 200, in response to the mean pixel data error received from the mean error calculating circuit 100 and the quantized step size q, establishes as a motion vector MV, the horizontal/vertical displacement (k,l) value at a point where the amount of data which is to be transmitted and which has been variable length encoded is minimized.

The mean error calculating circuit 100 includes a first $N_1 \times N_2$ block forming unit 10 for partitioning the current incoming picture into a pixel block of $N_1 \times N_2$ size, an $M_1 \times M_2$ block forming unit 200 for establishing a seek domain from a reference picture (i.e., a picture preceding the current picture, or a preceding picture reproduced from the DPCM loop) that is stored in a frame memory 7, a second $N_1 \times N_2$ block forming unit 30 for taking pixel data of a $N_1 \times N_2$ block size in accordance with the horizontal/vertical displacement (k,l) value from among the pixel data of the $M_1 \times M_2$ block, which was generated by the $M_1 \times M_2$ block forming unit 20, an adder A10 for obtaining a data error based on the outputs of the first and second $N_1 \times N_2$ block forming units 10 and 30, and a mean error calculating unit 40 for calculating an absolute mean (or a square mean) of errors outputted from the adder A10.

The motion vector setting circuit 200 includes a variable length encoded data amount estimating unit 60 for providing a first output $D_1$ and a variable length coded length operational unit 80 for providing a second output $D_2$, and an adder A20 which generates a sum of the first and second outputs $D_1$ and $D_2$. The output of the adder A20, or sum $D_1+D_2$, together with the horizontal/vertical displacement (k,l) value are input to a minimum value seek unit 50, which produces the motion vector MV. The motion vector MV is also input to a delayer 70, which provides a delayed signal to the adder A30.

More specifically, the variable length coded data amount estimating unit 60 estimates the mean error output by the mean error calculating unit 100 and the amount of data of the variable length encoded video signal in accordance with the quantized step size q so as to produce the output $D_1$. That is, the variable length coded data amount estimating unit 60, in accordance with the average error and quantized step size q and in response to the horizontal/vertical displacement (k, 1), estimates and then outputs the data D1 generated when the video image has gone through the transform encoding, quantization and VLC.

The coded length operational unit 80 operates on a coded length during the variable length encoding when the current horizontal/vertical displacement (k,l) value is selected as a motion vector to produce the output $D_2$. In other words, the variable length coded length operation unit 80, when the current horizontal/vertical displacement (k, 1) is selected as a motion vector, performs a PCM or DPCM on the displacement and performs an operation on the coded length of VLC to thereafter output the same.

The second adder A20 adds the output data $D_1$ of the variable length encoded data amount estimating unit 60 to the output data $D_2$ of the coded length operational unit 80 and outputs the sum to the minimum value seek unit 50. Thus, the adder A20 adds the image signal variable length encoded data quantity outputted from the variable length coded data quantity estimating unit 60 to the variable length coded length outputted form the variable length coded length operational unit 80. In response to the output data $D_1+D_2$ generated by the second adder A20 and the horizontal/vertical displacement (k,l) value, the unit 50 seeks a minimized horizontal/vertical displacement (k,l) value by locating where the output data $D_1+D_2$ of the adder is minimized. After determining the minimum value, the horizontal/vertical displacement (k,l) value is selected as the motion vector MV to thereby be outputted. The delayer 70 delays the motion vector MV outputted from the minimum value seek unit 50 for a predetermined period of time, and a third adder A30 calculates an error between the motion vector MV delayed at the delayer 70 and the current horizontal/vertical displacement (k,l) value to thereafter feedback the same to the coded length operational unit 80. The switch SW encodes the motion vector to thereby select PCM/DPCM.

Next, operation of the above-described motion estimating device of the present invention will be described.

When frame data VS of the current picture is received, the first $N_1 \times N_2$ block forming unit 10 partitions the current picture into a pixel block of $N_1 \times N_2$ size and outputs the pixel data of corresponding blocks to the first adder A10.

Figure 1:
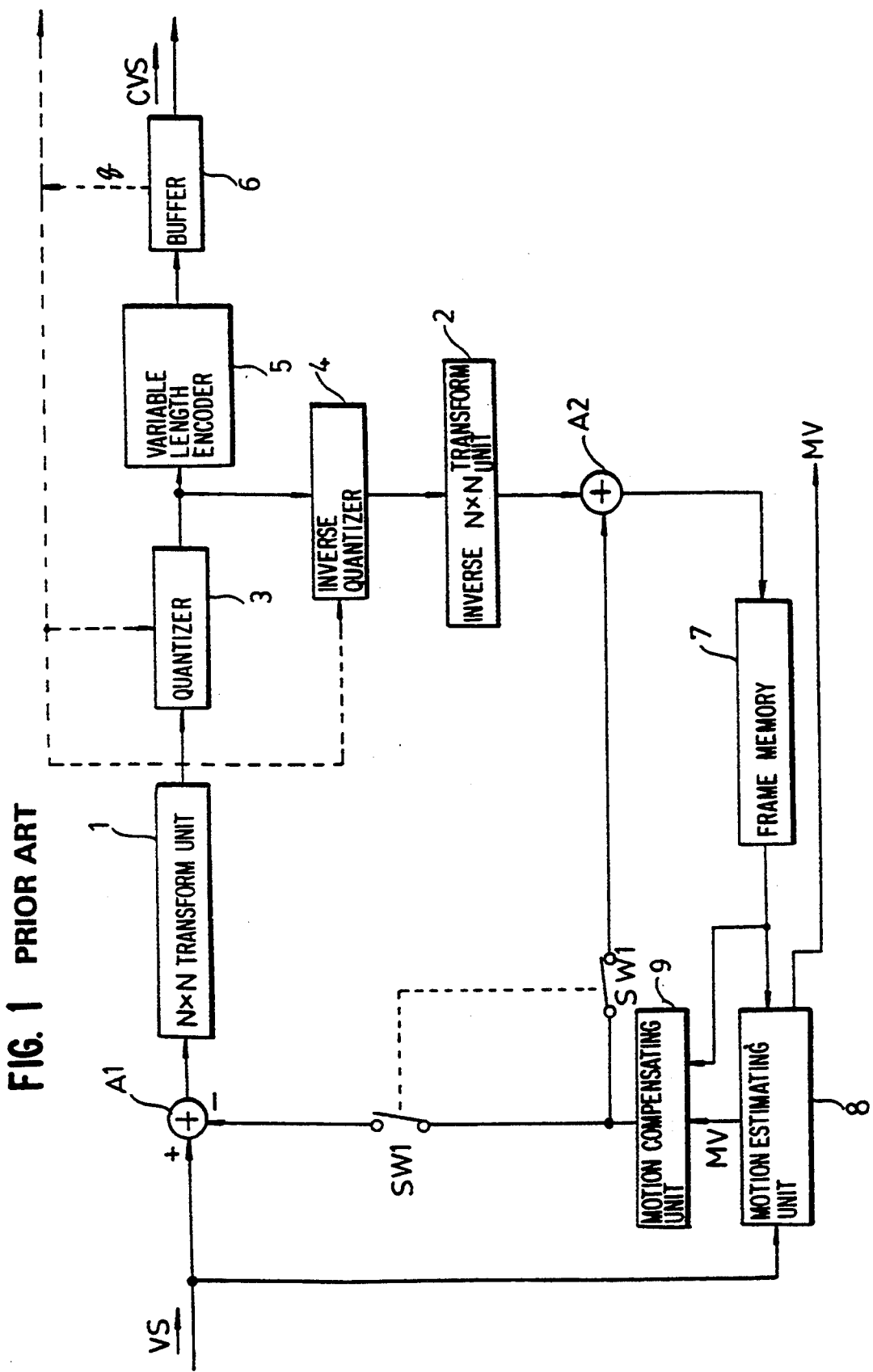
FIG. 1 is a block diagram of a conventional motion compensated coding device.
Figure 2:
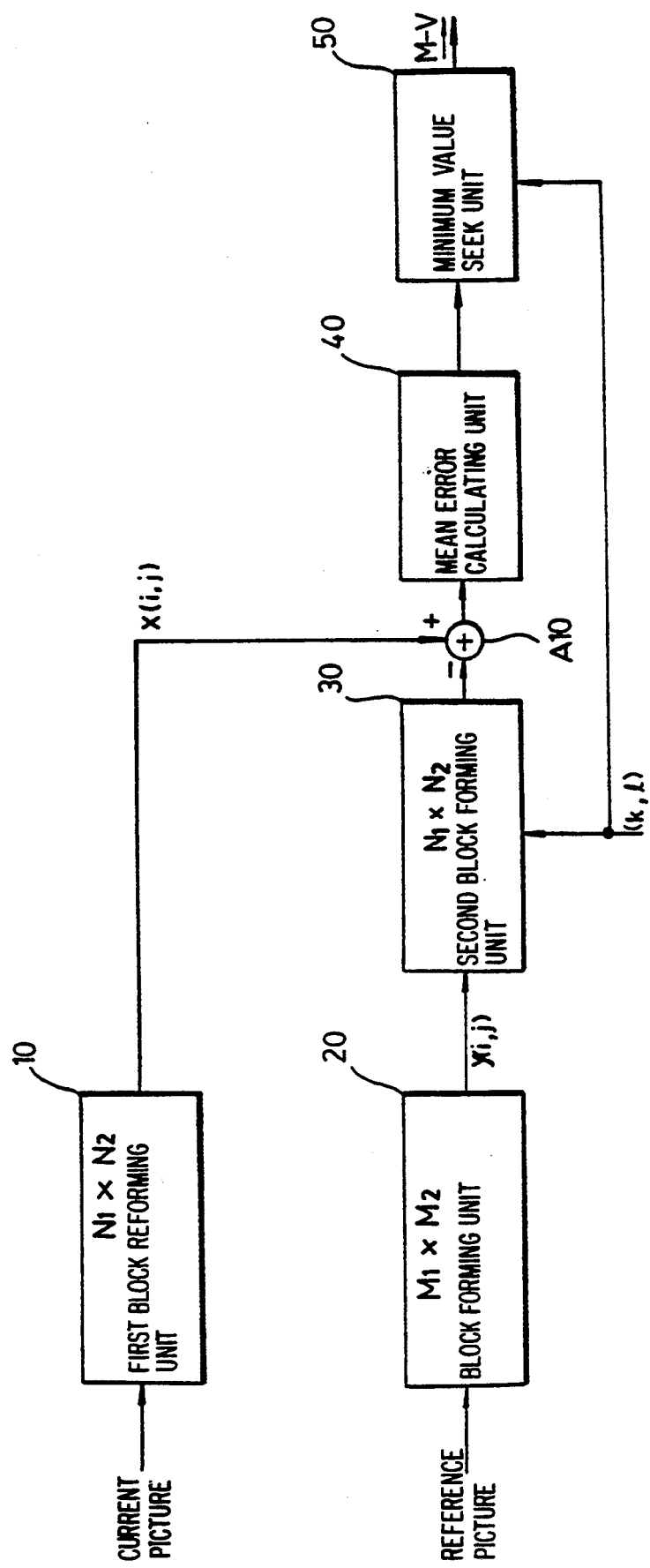
FIG. 2 is a block diagram of a conventional motion estimating device.

The $M_1 \times M_2$ block forming unit 20 partitions frame data of the reference picture, which is received from the frame memory 7, as illustrated in FIG. 1, into a seek domain block of $M_1 \times M_2$ size. The reference picture denotes a picture which precedes the current picture or a preceding picture reproduced from the DPCM loop. Alternatively, the reference picture can be composed of a video signal that is stored in a separate frame memory and delayed. In the embodiment disclosed, M is greater than N.

In order to discriminate which position of the reference picture the $N_1 \times N_2$ block has moved to/from with respect to the current picture, a seek block of $M_1 \times M_2$ which is larger than a block of $N_1 \times N_2$ currently being encoded is established.

The second $N_1 \times N_2$ block forming unit 30 partitions a pixel block from the $M_1 \times M_2$ seek domain that is generated by the $M_1 \times M_2$ block forming unit 20 into a pixel block of $N_1 \times N_2$ size and outputs pixel data in further accordance with the horizontal/vertical displacement (k,l) value.

The first adder A10 adds the data outputted from the first $N_1 \times N_2$ block forming unit 10 to the data outputted from the second $N_1 \times N_2$ block forming unit 30 in accordance with the horizontal/vertical displacement (k,l) value, to produce an error signal, accordingly. The error signal is then input to the mean error calculating unit 40. The mean error calculating unit 40 calculates a mean error of the pixel data based on the output of the adder A10.

At this moment, it should be noted that there are several methods of obtaining the mean error from the mean error calculating unit 40. Such methods include Mean Absolute Error MAE or Means Square Error MSE and the like are conventionally utilized.

Next, operation of the device will be explained wherein the mean error calculating unit 40 employs the Mean Absolute Error MAE method. A formula for calculating the Mean Absolute Error is as follows:

$$E(k,1) = \frac{1}{N_1 N_2} \sum_{i=1}^{N_1} \sum_{j=2}^{N_2} \{x(i,j) - y(i+k, j+1)\} \quad (1)$$

In response to the mean error E(K,l) calculated using equation (1) and the quantized step size q, the variable length coded data amount estimating unit 60 estimates a data amount generated when the error signal $\{X(i,j) - y(i+k, j+1)\}$ is variable length encoded from the mean error E (k,l) and quantized step size q.

At this moment, the estimated data amount ($D_1$) is approximately proportionate to the mean error E (k,l) and is inversely proportional to the step size q, which can be expressed by the following equation:

$$D_1 = k_1 \times E(k,l) \times q^{-k_2} \quad (2)$$

wherein, $k_1$ and $k_2$ are any integers which can determine experimental optimum values.

The data amount $D_1$ estimated by equation (2) in the variable length coded data amount estimating unit 60 is inputted to the second adder A20.

Meanwhile, at the coded length operational unit 80, when the horizontal/vertical displacement (k,l) value is selected as a motion vector, the displacement is directly transformed to a Pulse Code Modulation PCM or to a DPCM which locates a difference between the motion vector of the preceding block and the motion vector of the present block, to thereafter perform the variable length encoding and output the result $D_2$. At this time, the coded length $D_2$ has been determined in accordance with a statistical characteristic.

The second adder A20 adds the coded length $D_2$ outputted from the coded length operational unit 80 to a video signal coded data amount $D_1$ outputted from the variable length coded data amount estimating unit 60. The final data amount $D_1+D_2$ added by the second adder A20 is inputted to the minimum value seek unit 50 which changes the horizontal/vertical displacement (k,l) value and detects a horizontal/vertical displacement value where the final data amount $D_1+D_2$ is minimized. After determining the minimum data amount, the displacement value is output as a motion vector MV.

The delayer 70 delays the motion vector MV outputted from the minimum value seek unit 50. That is, the motion vector MV detected from the foregoing process is stored in the delayer 70 for the DPCM of a motion vector for the next block.

A switch SW selects PCM/DPCM in order to encode the motion vector.

As understood from the foregoing, the motion estimating device for variable length encoded data locates an optimum motion vector by generating a minimum data amount to thereby make the motion vector variable-length encoded, so as to overcome problems associated with conventional devices, such as the problem of reduced transmission data amounts.

Although the foregoing description of a preferred embodiment has been presented for the purpose of illustration and description, it will be obvious to one skilled in the art that various changes and modifications can be made without departing from the spirit and scope of the present invention, which is defined only be the claims appended hereto.

In particular, in the embodiment of FIG. 3, only an example was provided of an apparatus for block matching according to a full search, but it will be apparent that a three step search, hierarchical search and other kinds of motion vector estimating methods other than the full search can be applied to the present invention.

What is claimed is:

1. A motion estimating device for a variable length encoder which encodes a video signal into variable length encoded data comprising:
    a mean error calculating means, responsive to said video signal, for calculating a mean error corresponding to an estimated difference between pixel data of a reference picture and pixel data of a current picture of said video signal; and
    a motion vector setting means, coupled to an output of said mean error calculating means, for generating a motion vector corresponding to a minimum horizontal/vertical displacement of said current picture relative to said reference picture based upon a sum of a first data value corresponding to an estimated data amount of said variable length encoded data of said video signal and a second data value corresponding to a coded length of a variable length encoded motion vector when a current horizontal/vertical displacement is selected as said current motion vector.

2. A motion estimating device as defined in claim 1, wherein said mean error calculating means comprises:
    a first $N_1 \times N_2$ block forming circuit, responsive to said current picture of said video signal, for partitioning said current picture into a pixel data block of $N_1 \times N_2$ size;
    an $M_1 \times M_2$ block forming circuit for establishing a seek domain from said reference picture of said video signal having a pixel data block of $M_1 \times M_2$ size;
    a second $N_1 \times N_2$ block forming circuit, responsive to said pixel data block of $M_1 \times M_2$ size, for generating a reference pixel data block of $N_1 \times N_2$ block size from said seek domain including pixel data block of $M_1 \times M_2$ size output by said current $M_1 \times M_2$ block forming circuit in accordance with said horizontal/vertical displacement value;
    an adder, coupled to outputs of said first and second $N_1 \times N_2$ block forming circuits, for obtaining a data error based on respective outputs of said first and second $N_1 \times N_2$ block forming circuits; and
    a mean error calculating circuit, coupled to said adder, for calculating one of an absolute mean and square mean value error based on said data error generated by said adder.

3. A motion estimating device as defined in claim 1, wherein said motion vector setting means comprises:
    a variable length coded data amount estimating circuit, coupled and responsive to an output of said mean error calculating means and responsive to a quantized step size value, which is representative of an amount of video signals variable length-encoded, for estimating and outputting said first data value based on said output of said mean error calculating means and said amount of said video signals variable length-encoded;
    a coded length operational unit for performing a predetermined operation on a coded length of the variable length encoded data when the current horizontal/vertical displacement is selected as said current motion vector and for outputting said second data value corresponding thereto;
    a first adder, coupled to an output of said variable length coded data amount estimating circuit and said coded length operational unit, for adding and outputting said sum of said first and second data values; and
    a minimum value seek unit, coupled and responsive to an output of said first adder and responsive to said current horizontal/vertical displacement, for locating a horizontal/vertical displacement where said sum of said first and second data values is minimized, and for selecting a located horizontal/vertical displacement as the motion vector.

4. A motion estimating device as defined in claim 3, wherein said motion vector setting means further comprises:
    a delay circuit for delaying the motion vector output from the minimum value seek unit for a predetermined period of time; and
    a second adder for calculating an error between the motion vector output by said delay circuit and the current horizontal/vertical displacement by adding the delayed motion vector to the current horizontal/vertical displacement.

* * * * *